Jan. 18, 1938. H. W. PRICE 2,106,017
VALVE FOR BRAKES
Filed Oct. 9, 1935 2 Sheets-Sheet 2

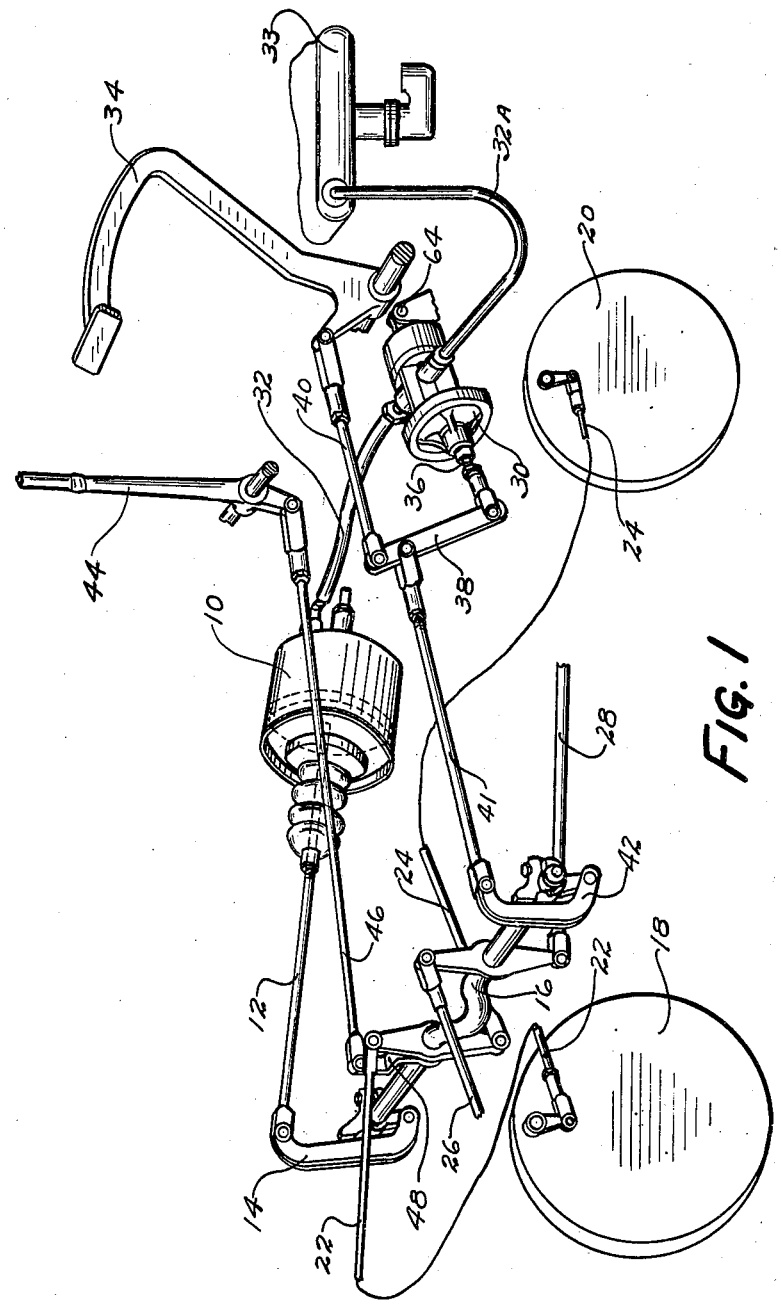

INVENTOR.
HAROLD W. PRICE
BY Jerome R. Cox
ATTORNEY.

Patented Jan. 18, 1938

2,106,017

UNITED STATES PATENT OFFICE 2,106,017

VALVE FOR BRAKES

Harold W. Price, South Bend, Ind., assignor to Bendix Products Corporation, South Bend, Ind., a corporation of Indiana Application October 9, 1935, Serial No. 44,165

2 Claims. (Cl. 121—46.5)

This invention relates to valves and is illustrated by a valve arrangement especially adapted for use in a vacuum power braking system for automobiles.

One of the objects of the invention is to provide a resistance to the operation of the valve, proportional to the power being controlled thereby.

One of the features of the device illustrated is the arrangement of the parts of the valve to provide a chamber in which the air is of the same non-atmospheric pressure (a partial vacuum such as may be created by a source of suction as illustrated) as in the power cylinder controlled thereby and to provide that the non-atmospheric air pressure in this chamber acts upon a movable member connected to the valve actuator.

Further objects and features of the invention will be apparent after a reading of the subjoined specification and claims and after a consideration of the accompanying drawings, in which:

Figure 1 is a diagrammatic view of a brake hookup employing a valve constructed according to my invention;

Figure 3:
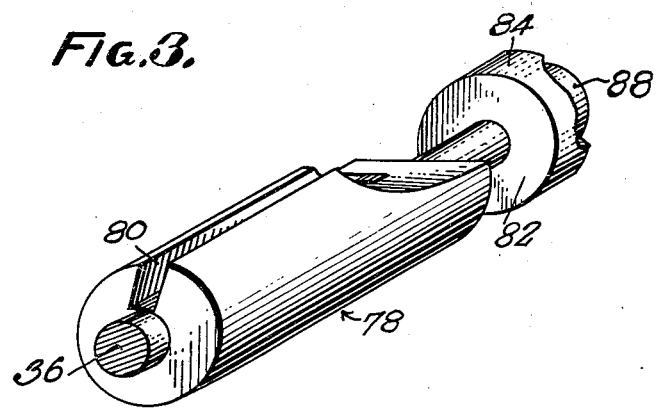
Figure 3 is a view in perspective of the movable valve element of Figure 2.
Figure 2:
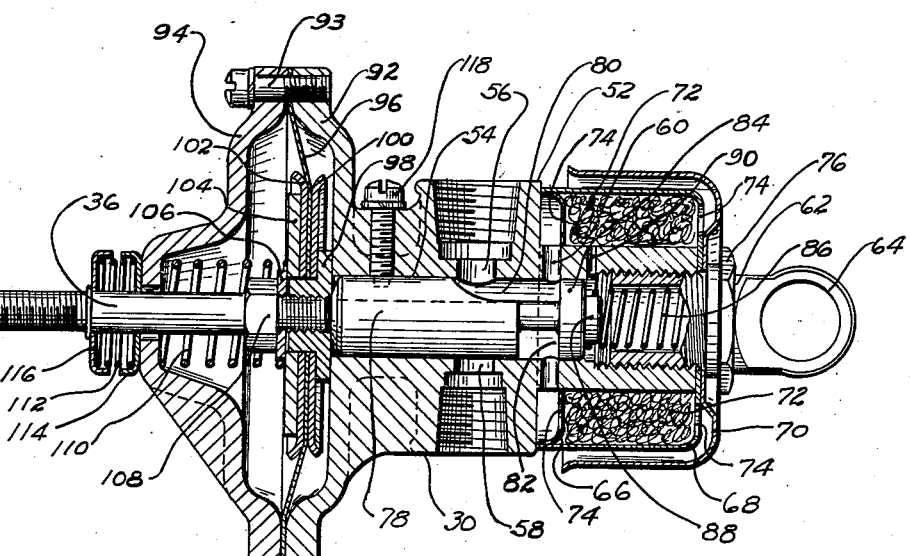
Figure 2 is a view in section of a valve such as that used in the hookup shown in Figure 1.

The brake operating hookup shown in Figure 1 is shown and described and is claimed in a co-pending joint application of Harold W. Price and Earl Price, Serial No. 41,442. It includes a power cylinder 10 having an operating piston connected by a tension link 12 and an overrunning joint 14 with a brake operating cross shaft 16. The cross shaft 16 is arranged to operate wheel brakes such as 18 and 20 by means of tension connections such as 22, 24, 26 and 28. The cylinder 10 is secured to the frame of the automobile and is controlled by a valve 30, to which it is connected by means of a conduit 32. The valve 30 is controlled by a pedal 34 to which an operating element 36 of the valve is pivotally connected by a floating lever 38 and a pedal link 40, the link 40 being pivotally connected both to the lever 38 and the pedal 34. The lever 38 is also pivotally connected to a tension rod 41 having an overrunning connection 42 with the cross shaft 16. Thus the reaction on the operating element 36 is transmitted to the pedal 34 and by virtue of the relative distances between the three pivotal connections of the lever 38, the reaction or feel is multiplied and the lost movement of the pedal is decreased. By virtue of the fact that the lever 38 is floating and that it moves with movement of the cross shaft in applying the brakes, the operator must follow up the brake applying movement of the cross shaft with corresponding movement of the pedal if he desires to increase or maintain the brake applying force.

In the event of failure of the vacuum power the brakes may be applied by the foot pedal 34 through the link 40, the lever 38, the link 41 and the connection 42. Furthermore, the brakes may be applied by a hand lever 44 through a link 46 and an overrunning connection 48. This hand lever arrangement will normally be used only in applying the brakes when parking.

The arrangement of the valve to provide a reaction on the operating element 36 proportional to the brake applying force exerted by the cylinder 10 is one of the important parts of my invention. For this purpose I provide the valve 30 comprising a central member 52 formed with a longitudinal main bore 54, a radial tapped operating connection bore 56, a tapped vacuum connection bore 58, and a diametrical air connection bore 60. The bore 56 is connected to the cylinder 10 by the conduit 32, and the bore 58 is connected to the intake manifold 33 by the conduit 33a. The forward end of the bore 54 is tapped to receive a plug 62 formed with a ring 64 for pivotally mounting the valve 30 on the chassis of the automobile.

Adjacent to said forward end the member 52 is reduced in diameter and over the reduced portion there are telescoped three sheet metal containers 66, 68 and 70 which cooperate with strainer material 72 to form an air strainer. The members 66 and 68 are formed with openings such as 74 to allow the passage of air therethrough. The member 66 is held in place by the pressure of the strainer material 72 and the members 68 and 70 are clamped in place by a nut 76 threaded on the plug 62.

I place in the bore 54 a substantially cylindrical valve member 78 which is formed however with a longitudinally extending passage 80 and with an annular recess 82. It may be seen that with the valve member 78 in the position shown, the bore 56 is connected by the passage 80 with the bore 60 and thus through the openings 74 and the strainer material 72 with the atmosphere. However, if the valve member 78 is moved a short distance to the left, a portion 84 thereof covers the bore 60 and shuts off the communication with the atmosphere. Should the valve member 78 be moved further, the bore 58 will be connected to the bore 56 by way of the annular recess 82. Thus in the position shown, the cylinder 10 is connected only to the atmosphere but if the valve member 78 should be moved slightly to the left the cylinder 10 would be cut off both from the atmosphere and the manifold and if it should be moved still farther to the left the cylinder would be connected with the manifold only.

The forward end of the bore 54 has a spring 86 which is provided for purposes later to be described and which bears at one end on the plug 62 and at the other on the valve member 78 being held in position by an extension 88 on the valve member. A small bore 90 connects the end of the bore with the air strainer and thus vents the end of the bore.

The rearward end of the member 52 is flared as at 92. Secured to the flared portion by bolts such as 93 is a vented cover 94 through which the operating element 36 extends. Clamped between the flared portion 92 of the member 52 and the cover 94 is a diaphragm 96. The central portion of the diaphragm is clamped to the operating element 36 by a nut 98 threaded on the inner end of the operating element 36. Protecting plates 100 and 102 are positioned on each side of the diaphragm, and outside of the plates there are positioned washers 104 and 106. These are all clamped to the element 36 by a nut 108 also screwed on said element 36. Thus movement of the element 36 requires a corresponding movement of the diaphragm 96 and resistance to movement of the diaphragm is transmitted to the element 36.

The passage 80 extends as is shown by the dotted line to the rearward end of the element 78 and therefore the pressure on the inner side of the diaphragm corresponds to that in the bore 56 and the cylinder 10. Inasmuch as the pressure on the outside of the diaphragm is atmospheric, the differential in pressure is the same as the differential acting on the piston in the cylinder 10 and the reaction on the element 36 is proportionate to the braking force exerted by the cylinder 10 although much less because the area of the diaphragm 96 is much smaller than the area of the piston.

The rearward end of the member 78 contacts with the nut 98 and the rearward movement of the member is thus limited by the movement of the nut. The spring 86 bearing on the forward end of the member 78 causes it to follow the movement of the nut 98. A spring 110 stronger than the spring 86 interposed between the washer 104 and the cover 94 normally urges the actuating element to the position shown and the operator must overcome the spring in operating the valve. In addition as soon as the bore 58 is connected to the bore 56 he must overcome the pneumatic force acting on the diaphragm 96 by reason of the differential of pressure between opposite sides thereof.

A spring 112 interposed between washers 114 and 116 secured to the operating member 36, cushions the return of the operating element.

The passage 80 cooperates with a screw 118 to guide the member 78 and prevent rotation thereof in the bore 54.

In the operation of the above described braking system, pressure exerted on the pedal 34 acts through the link 40 and the lever 38 to pull on the link 41 and the operating element 36. Due to the resistance of the brake return springs, the link 41 holds and the element 36 is moved compressing the spring 110 and allowing the spring 86 to move the member 78 to a position in which the bore 58 is connected through the recess 82 with the bore 56. Thus air is withdrawn from the forward end of the cylinder 10 and force is exerted by the piston thereof to pull the link 12 and operate the brakes. This releases the link 41 to reverse the movement of the lever 38 and lap the valve. In order to apply the brakes further, the operator must follow up the movement of the brakes by a corresponding movement of the pedal 34. The force exerted by the cylinder 10 in applying the brakes corresponds to the reaction felt on the pedal by reason of the differential in pressures on opposite sides of the diaphragm 96 as previously explained.

It is to be understood that the above described embodiments of my invention are for the purpose of illustration only and various changes may be made therein without departing from the spirit and scope of the invention.

I claim:

1. For use with a power operating system, a valve for controlling the passage of fluid under differential pressure to a power operator, comprising a casing formed with an inlet port, an outlet, and an exhaust port, a valve member movable in said casing, a pressure responsive means movable with said valve member, and an operating element connected to said pressure responsive means, the valve member being formed with a longitudinally extending passage connecting a space adjacent the pressure responsive means with said outlet, and the casing being provided with an anti-rotation means extending into said passage.

2. For use with a power operating system, a valve for controlling the passage of fluid under pressure differing from atmospheric pressure to a power operator, comprising a casing formed with a pressure chamber, an inlet for said fluid, an atmospheric inlet, and an outlet, a valve member movable in said casing, a pressure responsive means movable with said valve member and acted on by the pressure in said chamber, and an operating element connected to said pressure responsive means, the valve member being formed with a longitudinally extending passage connecting a space adjacent the pressure responsive means with said outlet, and the casing being provided with means for preventing rotation of said valve member comprising an element extending into said passage.

HAROLD W. PRICE.